United States Patent
Tsukamoto et al.

(10) Patent No.: US 9,298,984 B2
(45) Date of Patent: Mar. 29, 2016

(54) OBJECT DETECTION APPARATUS, METHOD FOR CONTROLLING THE OBJECT DETECTION APPARATUS, AND STORAGE MEDIUM

(71) Applicant: CANON KABUSHIKI KAISHA, Tokyo (JP)

(72) Inventors: Kenji Tsukamoto, Kawasaki (JP); Yasuo Katano, Kawasaki (JP); Masakazu Matsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 438 days.

(21) Appl. No.: 13/683,532

(22) Filed: Nov. 21, 2012

(65) Prior Publication Data
US 2013/0136303 A1    May 30, 2013

(30) Foreign Application Priority Data
Nov. 30, 2011 (JP) ................................. 2011-262655

(51) Int. Cl.
G06K 9/00 (2006.01)
G06T 7/20 (2006.01)

(52) U.S. Cl.
CPC ........ *G06K 9/00577* (2013.01); *G06K 9/00295* (2013.01); *G06T 7/208* (2013.01); *G06T 2207/10016* (2013.01); *G06T 2207/20016* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 7,039,233 B2 | 5/2006 | Mori et al. |
| 7,054,850 B2 | 5/2006 | Matsugu |
| 7,274,819 B2 | 9/2007 | Matsugu |
| 7,577,297 B2 | 8/2009 | Mori et al. |
| 7,881,524 B2 | 2/2011 | Matsugu et al. |
| 7,912,253 B2 | 3/2011 | Suzuki et al. |
| 7,995,805 B2 | 8/2011 | Suzuki et al. |
| 8,130,281 B2 | 3/2012 | Kaneda et al. |
| 8,209,172 B2 | 6/2012 | Mitarai et al. |
| 8,331,655 B2 | 12/2012 | Sato et al. |
| 8,340,439 B2 | 12/2012 | Mitarai et al. |

(Continued)

FOREIGN PATENT DOCUMENTS

JP    2007-257321 A    10/2007

OTHER PUBLICATIONS

H.Grabner, et al. "On-line Boosting and Vision", CVPR 2006.

(Continued)

*Primary Examiner* — Weiwen Yang
(74) *Attorney, Agent, or Firm* — Fitzpatrick, Cella, Harper & Scinto

(57) ABSTRACT

An object detection apparatus comprises a detection unit configured to calculate a detection likelihood from each of the plurality of frame images obtained by an image obtaining unit, and to detect a target object from each of the frame images based on the detection likelihood; and a tracking unit configured to calculate a tracking likelihood of the target object from each of the plurality of frame images, and to track the target object over the plurality of frame images based on the tracking likelihood, wherein the detection unit detects the target object from the frame images obtained by the image obtaining unit based on the tracking likelihood of the target object that is calculated by the tracking unit from the frame images, and the detection likelihood of the target object that is calculated by the detection unit from the frame images.

9 Claims, 8 Drawing Sheets

(56) References Cited

U.S. PATENT DOCUMENTS

| | | | |
|---|---|---|---|
| 2006/0088191 A1* | 4/2006 | Zhang et al. | 382/107 |
| 2006/0115157 A1 | 6/2006 | Mori et al. | |
| 2008/0063236 A1* | 3/2008 | Ikenoue et al. | 382/103 |
| 2008/0123968 A1* | 5/2008 | Nevatia et al. | 382/228 |
| 2011/0085702 A1* | 4/2011 | Nevatia et al. | 382/103 |
| 2011/0158535 A1 | 6/2011 | Iio et al. | |
| 2012/0033853 A1 | 2/2012 | Kaneda et al. | |
| 2012/0045120 A1 | 2/2012 | Tate et al. | |
| 2012/0057791 A1 | 3/2012 | Mitarai et al. | |
| 2012/0076417 A1 | 3/2012 | Yoshii et al. | |
| 2012/0148159 A1 | 6/2012 | Kaneda et al. | |

OTHER PUBLICATIONS

N. Dalal, et al., "Histograms of Oriented Gradients for Human Detection", IEEE CVPR 2005.
B. Leibe, et al., "Combined Object Categorization and Segmentation with an Implicit Shape Model", ECCV 2004.
M. Isard, et al., "Icondensation: Unifying low-level and high level tracking in a stochastic framework", ECCV 1998.
P. Felzenszwalb, et al., "A Discriminatively Trained, Multiscale, Deformable Part Model", CVPR 2009.
U.S. Appl. No. 13/572,342, filed Aug. 10, 2012; Inventors: Shiozaki, et al.
U.S. Appl. No. 13/421,278, filed Mar. 15, 2012; Inventors: Yamanaka, et al.
Takeuchi et al., "Vehicle Tracking Using Deformable Model and Particle Filters", IEICE Technical Report, Japan, The Institute of Electronics, Information and Communication Engineers, vol. 109 No. 41, pp. 269-274, Feb. 8, 2010.
Japanese Office Action issued Jul. 17, 2015 in Japanese Patent Application No. 2011-262655.

* cited by examiner

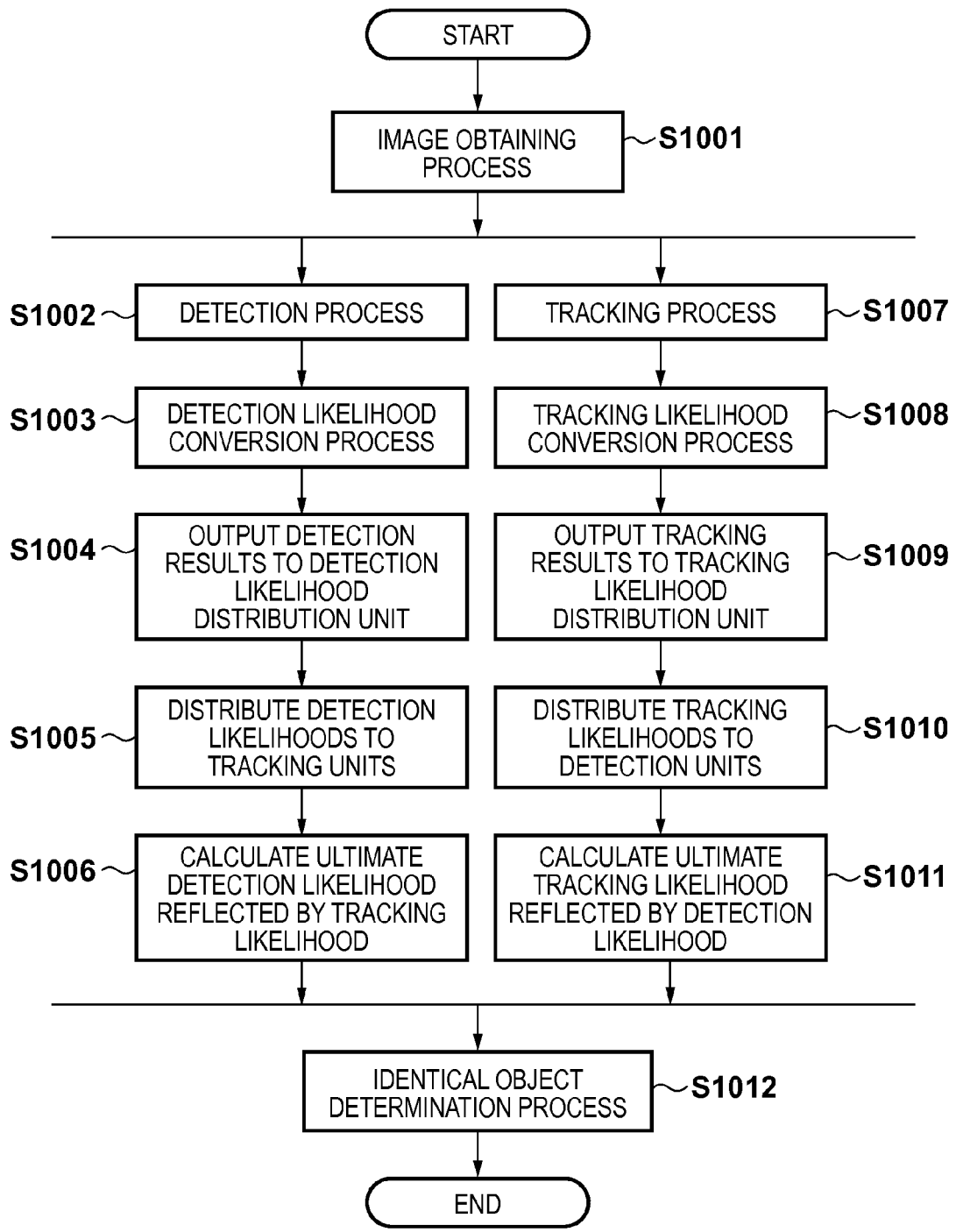

OBJECT DETECTION APPARATUS, METHOD FOR CONTROLLING THE OBJECT DETECTION APPARATUS, AND STORAGE MEDIUM

BACKGROUND OF THE INVENTION

1. Field of the Invention

The present invention relates to an object detection apparatus for detecting a target object from an image, a method for controlling the object detection apparatus, and a storage medium.

2. Description of the Related Art

Methods for detecting a target object from an image with the use of previously learned models have been known. Navneet Dalal and Bill Triggs "Histogram of Oriented Gradients for Human Detection", IEEE CVPR2005 discloses a method in which a large number of images are prepared, features called HOG are extracted from the images and learned using SVM, and the target object is detected with the use of the learned models.

Unfortunately, however, in the method described in Navneet Dalal and Bill Triggs, "Histogram of Oriented Gradients for Human Detection", IEEE CVPR2005, change in pose or occlusion of the target object would deteriorate detection accuracy of the target object.

In view of the aforementioned problem, the present invention provides a technique which allows robust detection of a target object against change in pose or occlusion of the target object.

SUMMARY OF THE INVENTION

According to one aspect of the present invention, there is provided an object detection apparatus comprising: an image obtaining unit configured to sequentially obtain a plurality of frame images; a detection unit configured to calculate a detection likelihood from each of the plurality of frame images, and to detect a target object from each of the frame images on the basis of the detection likelihood; and a tracking unit configured to calculate a tracking likelihood of the target object from each of the plurality of frame images, and to track the target object over the plurality of frame images on the basis of the tracking likelihood, wherein the detection unit detects the target object from the frame images obtained by the image obtaining unit on the basis of the tracking likelihood of the target object that is calculated by the tracking unit from the frame images, and the detection likelihood of the target object that is calculated by the detection unit from the frame images.

According to one aspect of the present invention, there is provided a method for controlling an object detection apparatus, comprising the steps of: sequentially obtaining a plurality of frame images; calculating a detection likelihood from each of the plurality of frame images, and detecting a target object from each of the frame images on the basis of the detection likelihood; calculating a tracking likelihood of the target object from each of the plurality of frame images, and tracking the target object over the plurality of frame images on the basis of the tracking likelihood; and wherein in the detecting step, the target object is detected from the frame images obtained in the image obtainment step on the basis of the tracking likelihood of the target object that is calculated in the tracking step from the frame images, and the detection likelihood of the target object that is calculated in the detection step from the frame images.

Further features of the present invention will be apparent from the following description of exemplary embodiments with reference to the attached drawings.

BRIEF DESCRIPTION OF THE DRAWINGS

FIG. 10 is a flowchart illustrating a sequence of processing steps of the object detection apparatus according to Embodiment 4.

DESCRIPTION OF THE EMBODIMENTS

An exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(Embodiment 1)

Figure 1:
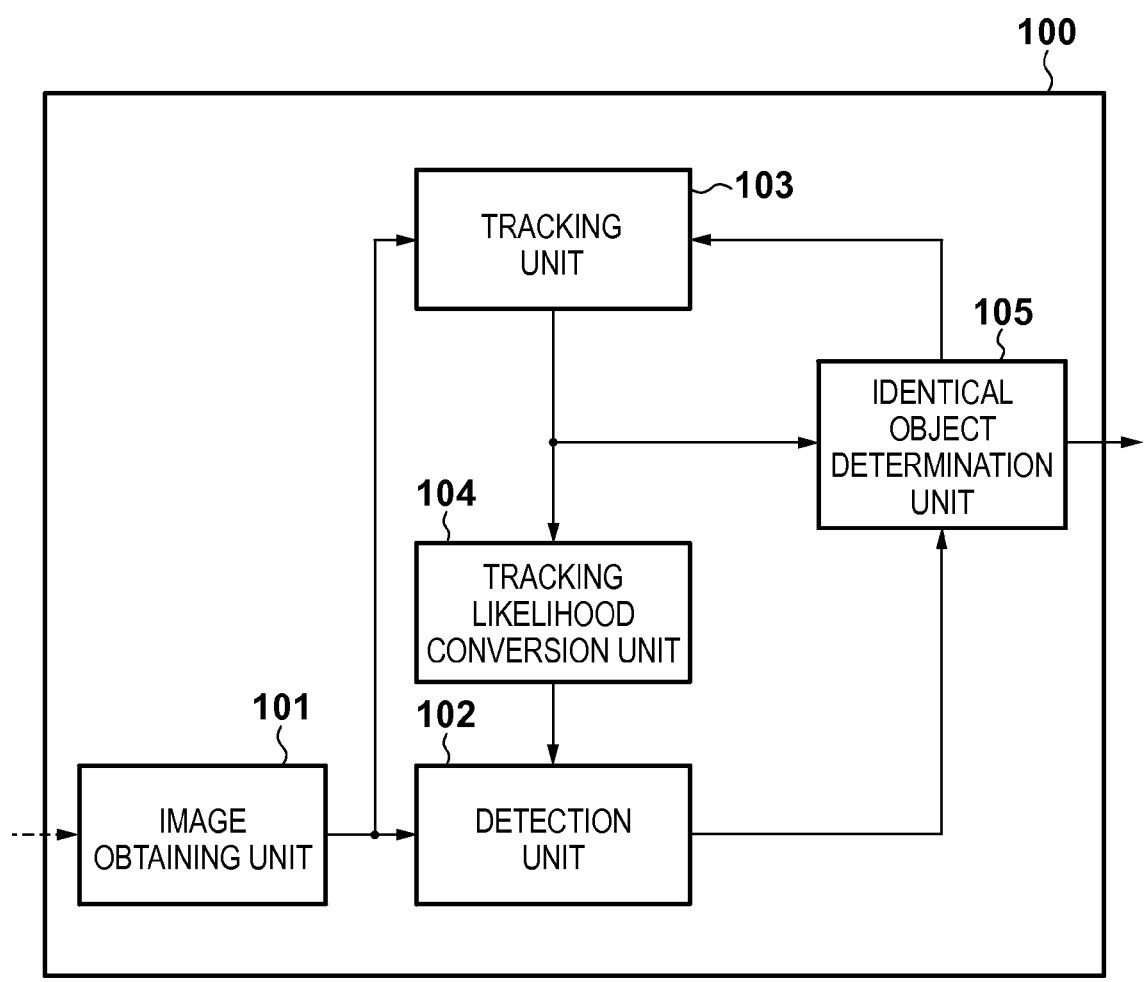
FIG. 1 illustrates a configuration of an object detection apparatus according to Embodiment 1.

A configuration of an object detection apparatus 100 according to Embodiment 1 will be described with reference to FIG. 1. The object detection apparatus 100 includes: an image obtaining unit 101; a detection unit 102; a tracking unit 103; a tracking likelihood conversion unit 104; and an identical object determination unit 105. Operations of the units are controlled by a CPU (not illustrated).

The image obtaining unit 101 sequentially obtains a plurality of frame images. The image obtaining unit 101 can obtain a plurality of frame images photographed by a camera. Alternatively, the image obtaining unit 101 can obtain, from a memory, a plurality of frame images which were photographed in advance and stored in the memory. The obtained frame images are outputted to the detection unit 102 and the tracking unit 103.

The detection unit 102 obtains the plurality of frame images outputted from the image obtaining unit 101, and performs a detection process for detecting a target object from the obtained frame images. For the detection process, any of well-known techniques can be employed, such as one using HOG and SVM, as described in "histograms of oriented gradients for human detection", N. Dalal, CVPR2005; one using ISM, as described in "Combined Object Categorization and Segmentation with an Implicit Shape Model", B. Leibe, ECCV2004; and one using Latent-SVM, as described in "A Discriminatively Trained, MultiScale, Deformable Part Model", P. Felzenszwalb, CVPR2009. Detection results (position information and size information on the target object) and a likelihood of the target object obtained by the detection process are outputted to the identical object determination unit 105.

The tracking unit 103 obtains the plurality of frame images outputted from the image obtaining unit 101, and performs a tracking process for tracking a target object with respect to the obtained frame images. That is, the tracking unit 103 calculates a tracking likelihood of the target object from each of the plurality of frame images, and tracks the target object over the plurality of frame images on the basis of the tracking likelihood thus calculated. For the tracking process, any of well-known techniques can be employed, such as one using Online Boosting, as described in H. Grabner, "Online Boosting and Vision", CVPR2006; and one using Condensation, as described in M. Isard A. Blake, "ICondensation: Unifying low-level and high-level tracking in a stochastic framework", ECCV1998. Note here that a target object to be tracked is decided on the basis of the position information and size information on the target object obtained from the identical object determination unit 105. Position information and size information and the likelihood of the target object obtained as the result of the tracking process are outputted to the tracking likelihood conversion unit 104 and the identical object determination unit 105.

The tracking likelihood conversion unit 104 obtains the tracking results outputted from the tracking unit 103 and converts, with reference to the obtained position information and size information and the likelihood of the target object, the likelihood into a form usable in the detection unit 102. For example, the tracking likelihood conversion unit 104 converts the likelihood to a normalized likelihood so that both the likelihood from the detection unit 102 and the likelihood from the tracking unit 103 can be compared with each other.

Figure 3:
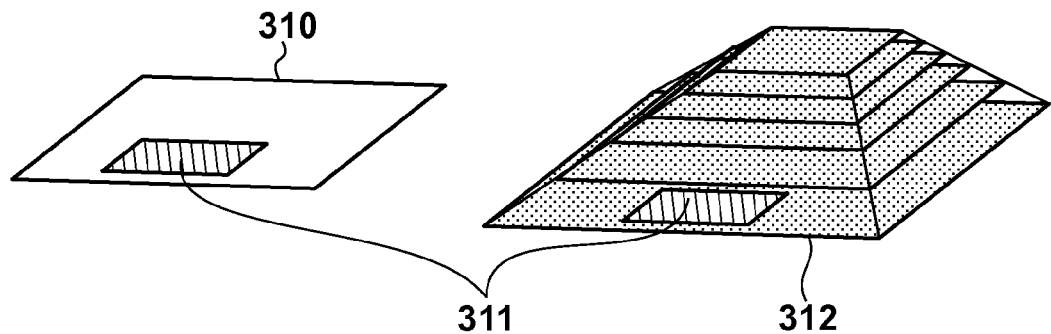
FIG. 3 is a diagram for explaining a processing of the object detection apparatus according to Embodiment 1.

Specifically, as illustrated in FIG. 3, the tracking unit 103 calculates a likelihood of the target object to be tracked within a search range 311 in an image 310 of a certain scale on the basis of the position information and size information on the target object to be tracked. The search range 311 corresponds to a part of a processing range 312 of an image pyramid which is subjected to the detection process. The likelihood of the tracked target object is converted so as to be subjected to the likelihood calculation processing in the detection process. Note here that the image pyramid is configured to be a collection of images having various resolutions between a high resolution and a low resolution. The likelihood converted by the tracking likelihood conversion unit 104 is outputted to the detection unit 102. The detection unit 102 calculates an ultimate likelihood in a second or any subsequent frame by combining the likelihood obtained from the tracking likelihood conversion unit 104 with the likelihood of the target object in an image obtained by the detection process, and outputs the calculated ultimate likelihood to the identical object determination unit 105. Note here that the ultimate likelihood can be calculated by obtaining an additional value, average value or the like, of the both normalized likelihoods. If such a value is more than a threshold, then it can be determined to be of the target object.

The identical object determination unit 105 refers to the detection results outputted from the detection unit 102 and the tracking results outputted from the tracking unit 103, and determines whether or not the detection results and the tracking results represent the identical target object. For example, as given by Formulae (1) and (2), the position information and the size information on the target object ("detection") obtained from the detection results are compared with those on the tracked target object ("tracking"). When the comparison determines that the positions are substantially the same (the distance is substantially zero) as shown by Formulae (1) and the sizes are substantially the same (the ratio of the sizes is substantially one) as shown by Formulae (2), then the identical object determination unit 105 determines that both results represent the identical target object.

[Formula 1]

$$\text{distance(detection, tracking)} \cong 0 \qquad (1)$$

[Formula 2]

$$\frac{\text{size(detection)}}{\text{size(tracking)}} \cong 1 \qquad (2)$$

Alternatively, it is also possible to determine stochastically, i.e. by applying positions and sizes to a Gaussian distribution, whether or not both results represent the identical target object. Alternatively, detection results and tracking results can be provided in a proportion of one to one. The result determined by the identical object determination unit 105 is to be regarded as an ultimate detection result. Alternatively, it can be determined whether or not a difference between the ultimate tracking likelihood calculated by the tracking unit 103 and the detection likelihood calculated by the detection unit 102 lies within a certain range, in order to determine that both results represent the identical target object. When it is determined that both results represent the identical target object, such determination result will be outputted to the tracking unit 103, and the tracking unit 103 will maintain the tracking process. On the other hand, when it is determined that both results do not represent the identical target object, that is, in a case where, for example, a new target object is additionally detected, such determination result will be outputted to the tracking unit 103, and the tracking unit 103 will perform an additional tracking process with respect to the new target object.

Figure 2:
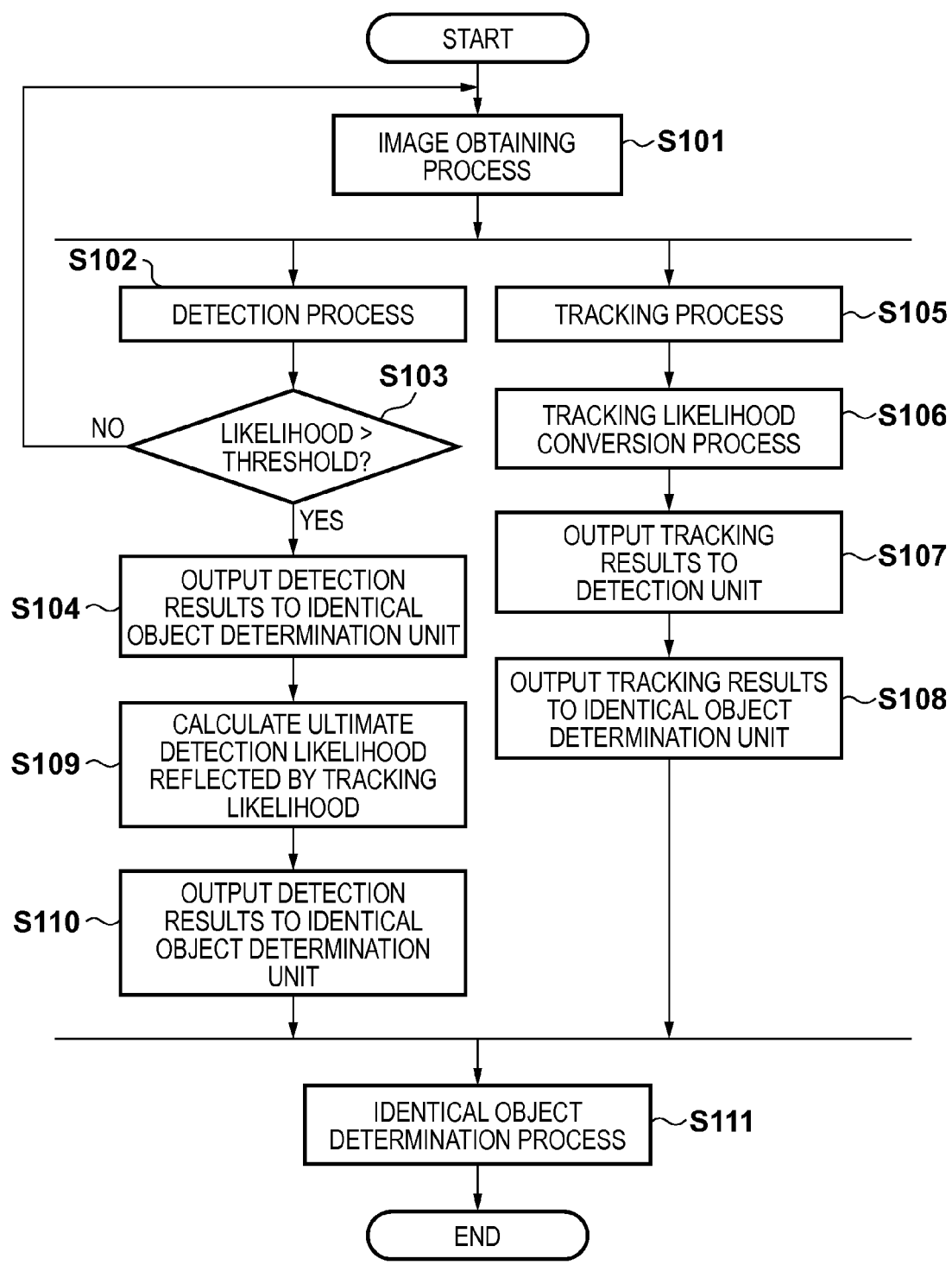
FIG. 2 is a flowchart illustrating a sequence of processing steps of the object detection apparatus according to Embodiment 1.

Referring now to a flowchart of FIG. 2, processing steps to be performed by the object detection apparatus 100 of Embodiment 1 will be described. It should be noted that program codes in accordance with the flowchart are stored in a memory (not illustrated), such as RAM or ROM, and will be read out for execution by a CPU (not illustrated).

In a step S101, the image obtaining unit 101 obtains a plurality of frame images from photographic equipment, an image file, or the like. The obtained frame images are outputted to the detection unit 102 and the tracking unit 103. In a step S102, the detection unit 102 performs a detection process for detecting a target object from the plurality of frame images obtained in the step S101. In a step S103, the detection unit 102 determines whether or not a likelihood which is obtained by the detection process is more than a threshold. When the likelihood is determined to be more than the threshold (S103; YES), it is possible to determine that a target object is detected in that position and that size. Accordingly, the processing goes to a step S104. On the other hand, when the likelihood is determined to be less than the threshold (S103; NO), it is possible to determine that a target object is not detected. Accordingly, the processing goes back to the step S101.

In the step S104, the detection unit 102 outputs the detection results to the identical object determination unit 105. In a step S105, the tracking unit 103 performs a tracking process for tracking a target object with respect to the plurality of frame images obtained from the image obtaining unit 101.

Note here that a target object to be tracked is decided on the basis of the position information and size information on the target object obtained from the identical object determination unit 105. Position information and size information and a likelihood of the target object obtained as the result of the tracking process are outputted to the tracking likelihood conversion unit 104 and the identical object determination unit 105. Then, the processing goes to a step S106.

In the step S106, the tracking likelihood conversion unit 104 converts, with reference to the tracking results obtained from the tracking unit 103, in particular, the position information and size information and the likelihood of the target object, the likelihood into a form usable in the detection unit 102.

In a step S107, the tracking likelihood conversion unit 104 outputs the likelihood converted in the step S106 to the detection unit 102. In a step S108, the tracking unit 103 outputs the tracking results to the identical object determination unit 105.

In a step S109, the detection unit 102 calculates an ultimate likelihood by combining the likelihood obtained from the tracking likelihood conversion unit 104 with the likelihood in an image obtained by the detection process. In a step S110, the detection unit 102 outputs the calculated ultimate likelihood to the identical object determination unit 105. Subsequently, the processing goes to a step S111.

In the step S111, the identical object determination unit 105 refers to the detection results from the detection unit 102 and the tracking results from the tracking unit 103, and determines whether or not the detection results and the tracking results represent the identical target object. For example, as given by Formulae (1) and (2), the position information and the size information on the target object obtained from the detection results are compared with those on the tracked target object. When the comparison determines that the positions are substantially the same and the sizes are substantially the same, then the identical object determination unit 105 determines that both results represent the identical target object. The identical object determination unit 105 outputs such determination result and ends the processing. All the steps in the flowchart of FIG. 2 thus end.

As has been described above, according to the present embodiment, the tracking results obtained by the tracking unit are reflected on the detection results obtained by the detection unit. Therefore, the present embodiment improves detection accuracy in the detection process in a second or any subsequent frame (a second detection process), allowing robust detection of a target object against change in pose or occlusion of the target object.

(Embodiment 2)

Figure 4:
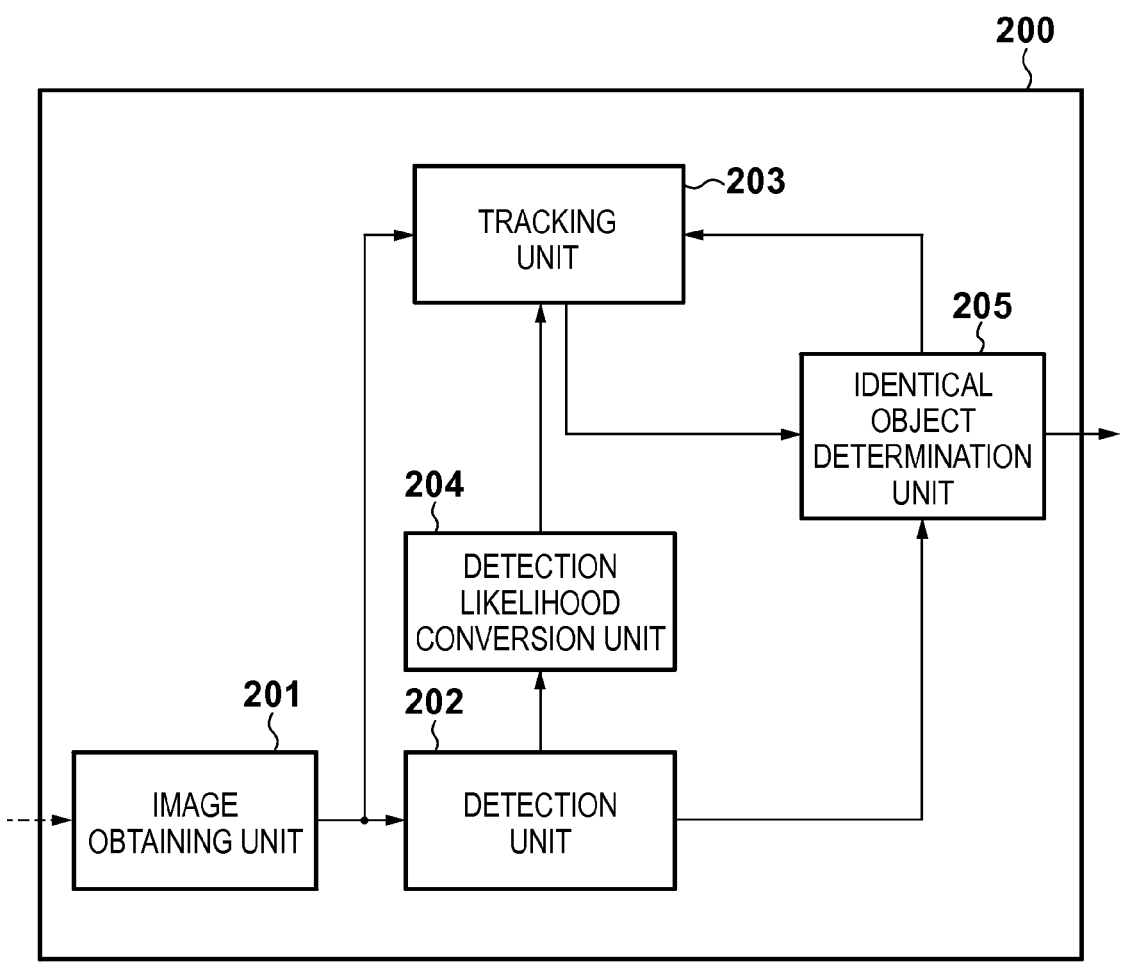
FIG. 4 illustrates a configuration of an object detection apparatus according to Embodiment 2.

A configuration of an object detection apparatus 200 according to Embodiment 2 will be described with reference to FIG. 4. The object detection apparatus 200 includes: an image obtaining unit 201; a detection unit 202; a tracking unit 203; a detection likelihood conversion unit 204; and an identical object determination unit 205. The object detection apparatus 100 of Embodiment 1 includes the tracking likelihood conversion unit 104, whereas the object detection apparatus 200 of Embodiment 2 includes the detection likelihood conversion unit 204, instead of the tracking likelihood conversion unit 104.

The image obtaining unit 201 has the same function as that of the image obtaining unit 101, and therefore a description thereof is omitted.

The detection unit 202 obtains a plurality of frame images outputted from the image obtaining unit 201, and performs a detection process for detecting a target object from the obtained frame images. Detection results (position information and size information on the target object) and a likelihood of the target object obtained by the detection process are outputted to the detection likelihood conversion unit 204 and the identical object determination unit 205.

The tracking unit 203 obtains the plurality of frame images outputted from the image obtaining unit 201, and performs a tracking process for tracking a target object with respect to the obtained frame images. Note here that a target object to be tracked is decided on the basis of the position information and size information on the target object obtained from the identical object determination unit 205. Position information and size information and a likelihood of the target object obtained as the result of the tracking process are outputted to the identical object determination unit 205.

Figure 6:
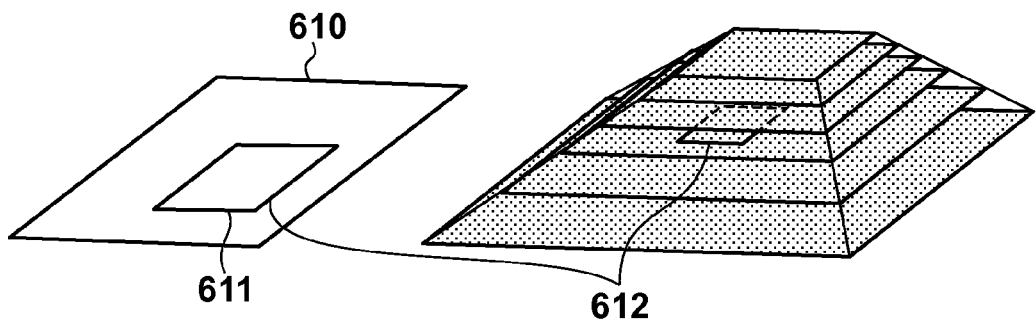
FIG. 6 is a diagram for explaining a processing of the object detection apparatus according to Embodiment 2.

The detection likelihood conversion unit 204 obtains the detection results outputted from the detection unit 202 and converts, with reference to the obtained detection results, in particular, the position information and size information and the likelihood of the target object, the likelihood into a form usable in the tracking unit 203. Specifically, as illustrated in FIG. 6, on the basis of the position information and size information on the detected target object, a likelihood map 611 in an image 610 of a certain scale is determined. The detection likelihood conversion unit 204 extracts a likelihood of a range 612 which corresponds to the likelihood map 611 obtained from the detection process results, and converts the extracted likelihood so that it matches the normalized likelihood range outputted from the tracking unit 203. The detection likelihood converted by the likelihood conversion unit 204 is outputted to the tracking unit 203. The tracking unit 203 calculates an ultimate likelihood in a second or any subsequent frame by combining the likelihood obtained from the detection likelihood conversion unit 204 with the likelihood of the target object in an image obtained by the tracking process, and outputs the calculated ultimate likelihood to the identical object determination unit 205.

The identical object determination unit 205 refers to the detection results outputted from the detection unit 202 and the tracking results outputted from the tracking unit 203, and determines whether or not the detection results and the tracking results represent the identical target object. In the same way as Embodiment 1, as given by Formulae (1) and (2), the position information and the size information on the target object obtained from the detection results are compared with those on the tracked target object. When the comparison determines that the positions are substantially the same and the sizes are substantially the same, then the identical object determination unit 205 determines that both results represent the identical target object.

Figure 5:
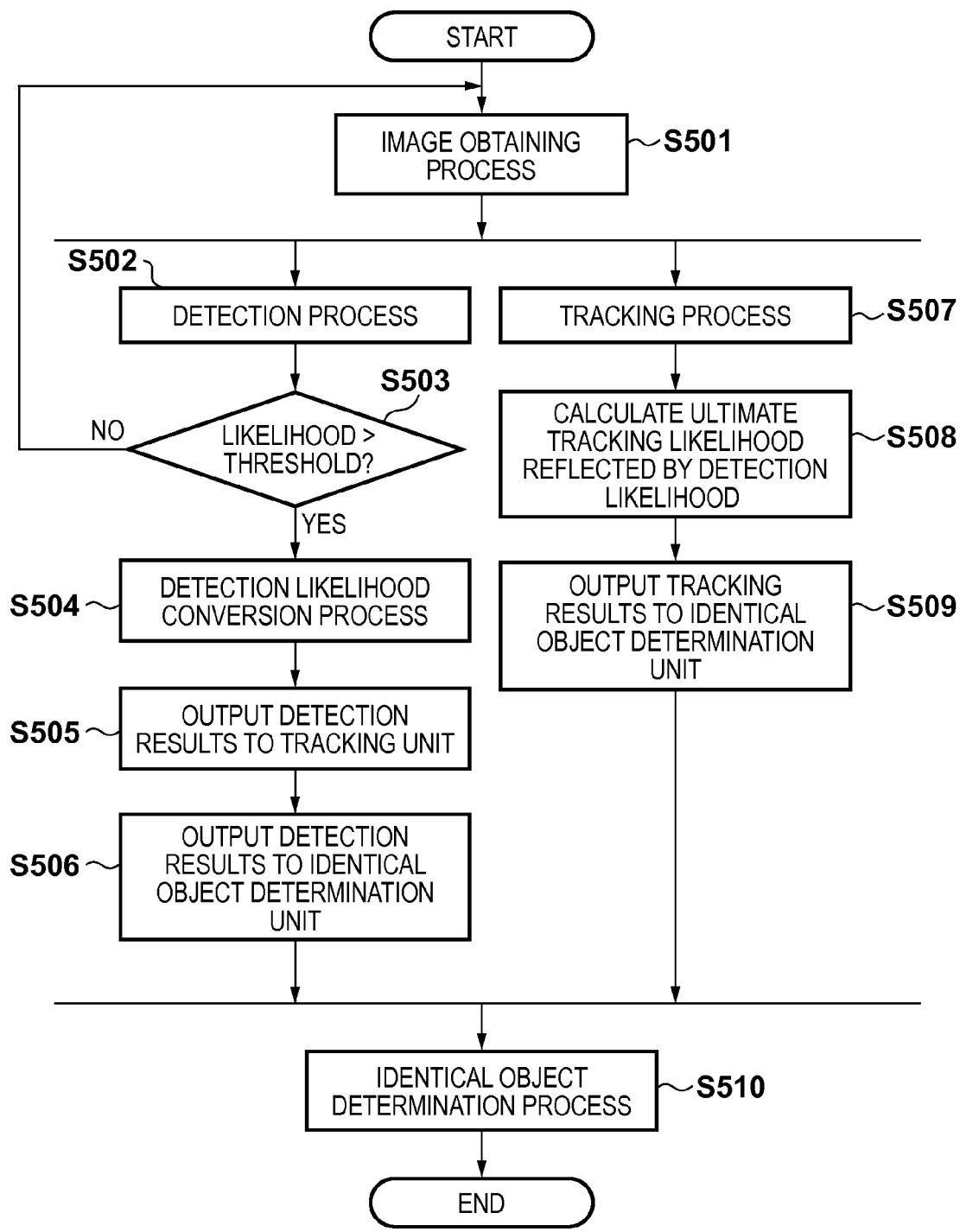
FIG. 5 is a flowchart illustrating a sequence of processing steps of the object detection apparatus according to Embodiment 2.

Referring now to a flowchart of FIG. 5, processing steps to be performed by the object detection apparatus 200 of Embodiment 2 will be described. Processes in steps S501 and S502 are equivalent to those in the steps S101 and S102, and therefore descriptions thereof are omitted.

In a step S503, the detection unit 202 determines whether or not a likelihood obtained by the detection process is more than a threshold. When the likelihood is determined to be more than the threshold (S503; YES), it is possible to determine that a target object is detected in that position and that size. Accordingly, the detection unit 202 outputs the detection results to the detection likelihood conversion unit 204. The processing thus goes to a step S504. On the other hand, when the likelihood value is determined to be less than the threshold (S503; NO), it is possible to determine that the target object is not detected. Accordingly, the processing goes back to the step S501.

In the step S504, the detection likelihood conversion unit 204 obtains the detection results outputted from the detection unit 202, and converts, with reference to the obtained detection results, in particular, the position information and size information and the likelihood of the target object, the likelihood into a form usable in the tracking unit 203.

In a step S505, the detection likelihood conversion unit 204 outputs the likelihood converted in the step S504 to the tracking unit 203. In a step S506, the detection unit 202 outputs the detection results to the identical object determination unit 205.

In a step S507, the tracking unit 203 performs a tracking process for tracking a target object with respect to the plurality of frame images obtained from the image obtaining unit 201. Note here that a target object to be tracked is decided on the basis of the position information and size information on the target object obtained from the identical object determination unit 205.

In a step S508, the tracking unit 203 calculates an ultimate likelihood, taking into consideration the likelihood obtained from the detection likelihood conversion unit 204, and determines a position of the tracked target object. In a step S509, the tracking unit 203 outputs the position information and size information and the likelihood of the target object, which have been obtained as the result of the tracking process, to the identical object determination unit 205.

A process in a step S510 is equivalent to that of the step S111, and therefore a description thereof is omitted. All the steps in the flowchart of FIG. 5 thus end.

As has been described above, according to the present embodiment, the detection results obtained by the detection unit are reflected on the tracking results obtained by the tracking unit. Therefore, the present embodiment improves tracking accuracy in the tracking process in a second or any subsequent frame (a second tracking process), allowing robust tracking of a target object against change in pose or occlusion of the target object.

(Embodiment 3)

Figure 7:
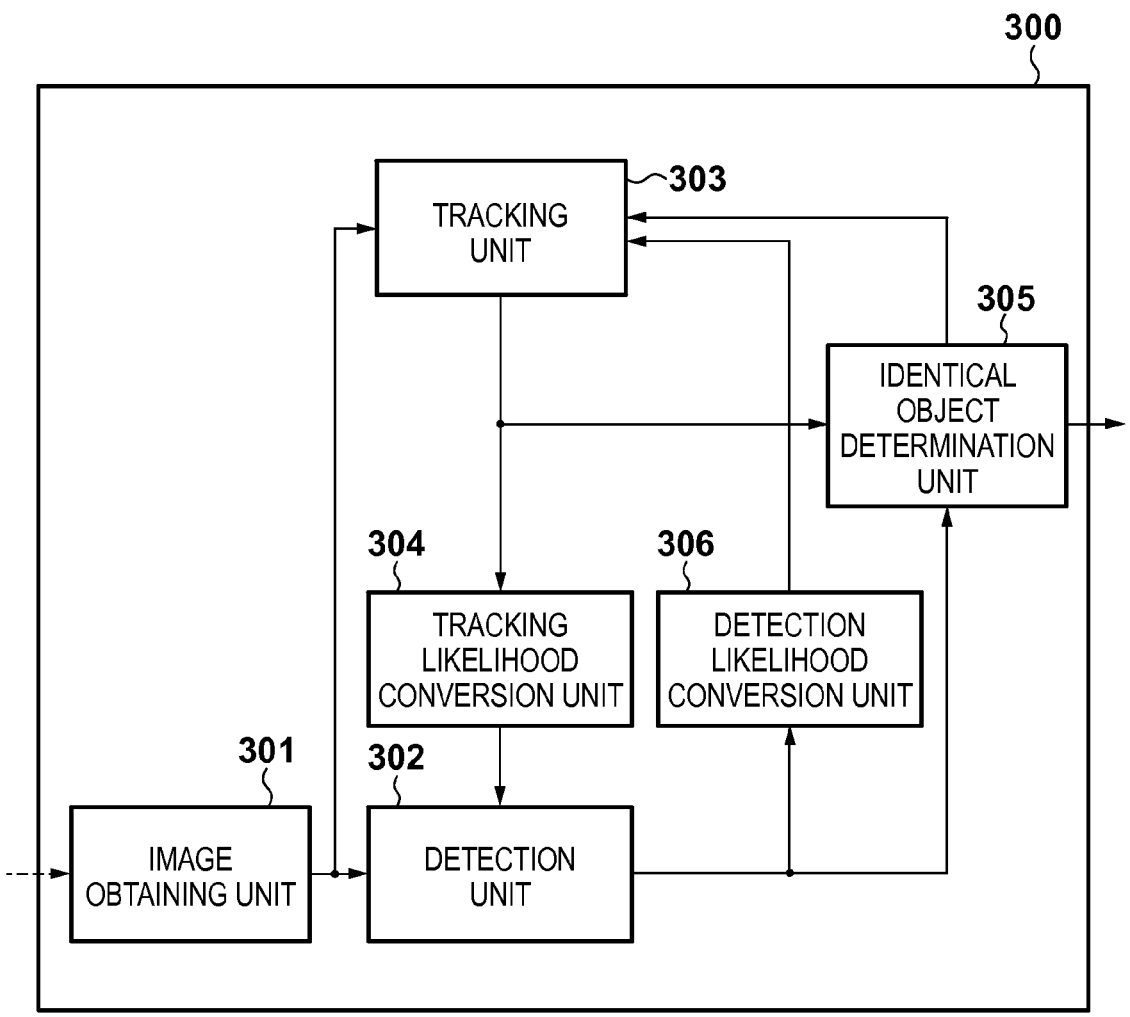
FIG. 7 illustrates a configuration of an object detection apparatus according to Embodiment 3.

A configuration of an object detection apparatus 300 according to Embodiment 3 will be described with reference to FIG. 7. The object detection apparatus 300 includes: an image obtaining unit 301; a detection unit 302; a tracking unit 303; a tracking likelihood conversion unit 304; an identical object determination unit 305; and a detection likelihood conversion unit 306. While the object detection apparatus 100 of Embodiment 1 includes the tracking likelihood conversion unit 104, and the object detection apparatus 200 of Embodiment 2 includes the detection likelihood conversion unit 204. The object detection apparatus 300 of Embodiment 3 includes both the tracking likelihood conversion unit 304 and the detection likelihood conversion unit 306. The image obtaining unit 301 has the same function as that of the image obtaining unit 101, and therefore a description thereof is omitted.

The detection unit 302 obtains a plurality of frame images outputted from the image obtaining unit 301, and performs a detection process for detecting a target object from the obtained frame images. Detection results (position information and size information on the target object) and a likelihood of the target object obtained by the detection process are outputted to the detection likelihood conversion unit 306 and the identical object determination unit 305.

The tracking unit 303 obtains the plurality of frame images outputted from the image obtaining unit 301, and performs a tracking process for tracking a target object with respect to the obtained frame images. Note here that a target object to be tracked is decided on the basis of the position information and size information on the target object obtained from the identical object determination unit 305. Position information and size information and a likelihood of the target object obtained as the result of the tracking process are outputted to the tracking likelihood conversion unit 304 and the identical object determination unit 305.

The tracking likelihood conversion unit 304 obtains the tracking results outputted from the tracking unit 303, and converts, with reference to the obtained position information and size information and the likelihood of the target object, the likelihood into a form usable in the detection unit 302. The likelihood converted by the tracking likelihood conversion unit 304 is outputted to the detection unit 302. The detection unit 302 calculates an ultimate likelihood in a second or any subsequent frame by combining the likelihood obtained from the tracking likelihood conversion unit 304 with the likelihood of the target object in an image obtained by the detection process, and outputs the calculated ultimate likelihood to the identical object determination unit 305.

The detection likelihood conversion unit 306 obtains the detection results outputted from the detection unit 302 and converts, with reference to the obtained detection results, in particular, the position information and size information and the likelihood of the target object, the likelihood to a form usable in the tracking unit 303. The likelihood converted by the detection likelihood conversion unit 306 is outputted to the tracking unit 303. The tracking unit 303 calculates an ultimate likelihood in a second or any subsequent frame by combining the likelihood obtained from the detection likelihood conversion unit 306 with the likelihood of the target object in an image obtained by the tracking process, and outputs the calculated ultimate likelihood to the identical object determination unit 305.

The identical object determination unit 305 refers to the detection results outputted from the detection unit 302 and the tracking results outputted from the tracking unit 303, and determines whether or not the detection results and the tracking results represent the identical target object. In the same way as Embodiment 1, as given by Formulae (1) and (2), the position information and the size information on the target object obtained from the detection results are compared with those on the tracked target object. When the comparison determines that the positions are substantially the same and the sizes are substantially the same, then the identical object determination unit 305 determines that both results represent the identical target object.

Figure 8:
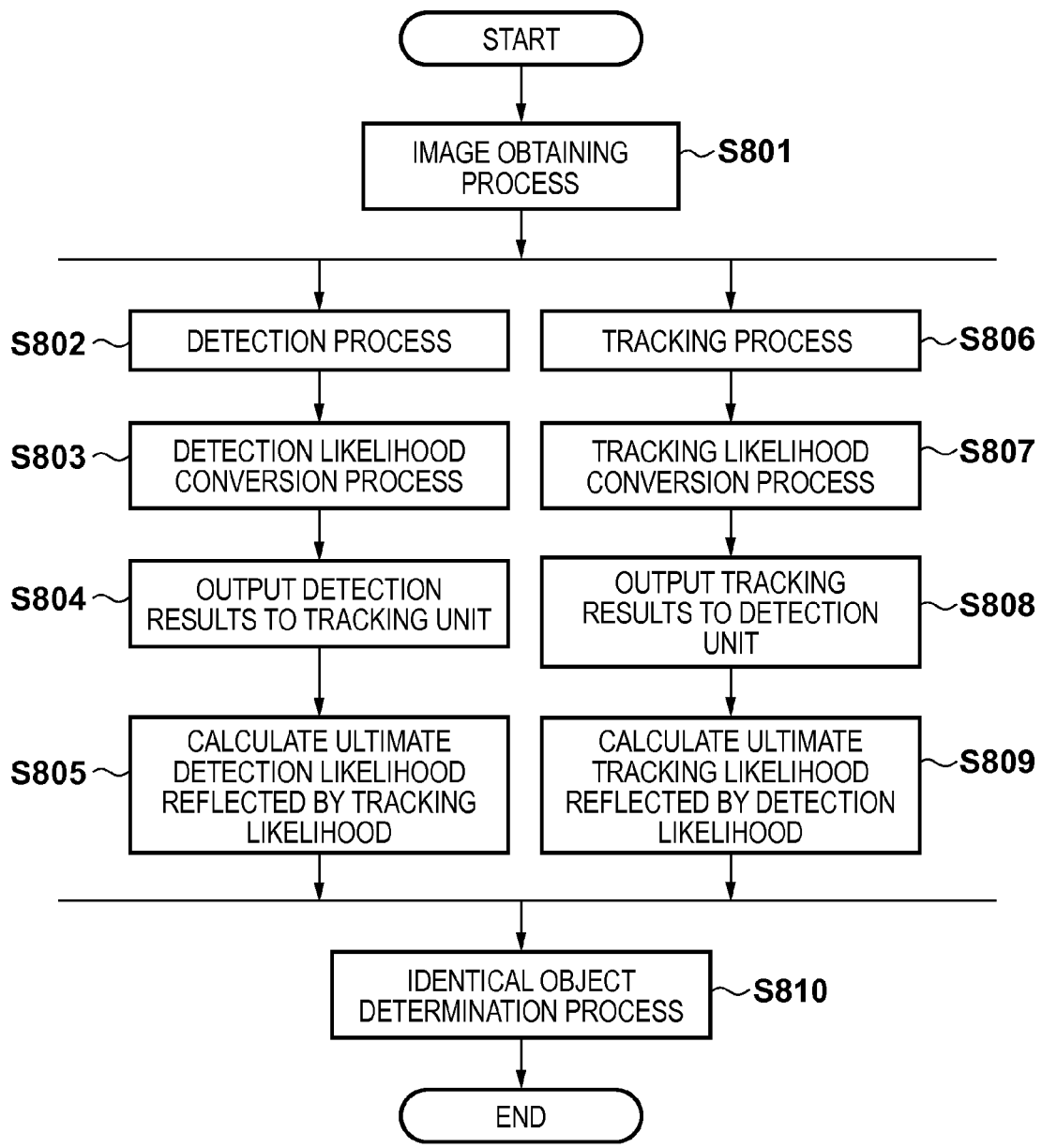
FIG. 8 is a flowchart illustrating a sequence of processing steps of the object detection apparatus according to Embodiment 3.

Referring now to a flowchart of FIG. 8, processing steps to be performed by the object detection apparatus 300 of Embodiment 3 will be described. Processes in steps S802 through S805 are executed in parallel to processes in steps S806 through S809. A process in a step S801 is equivalent to that in the step S101 and therefore a description thereof is omitted.

In a step S802, the detection unit 302 obtains the plurality of frame images outputted from the image obtaining unit 301, and performs a detection process for detecting a target object from the obtained frame images. Detection results (position information and size information on the target object) and a likelihood of the target object obtained by the detection process are outputted to the detection likelihood conversion unit 306 and the identical object determination unit 305.

In a step S803, the detection likelihood conversion unit 306 obtains the detection results outputted from the detection unit 302 and converts, with reference to the obtained detection results, in particular, the position information and size information and the likelihood of the target object, the likelihood into a form usable in the tracking unit 303.

In a step S804, the detection likelihood conversion unit 306 outputs the likelihood converted in the step S803 to the tracking unit 303. In a step S805, the detection unit 302 calculates an ultimate likelihood by combining the likelihood obtained from the tracking likelihood conversion unit 304 with the likelihood of the target object in an image obtained by the detection process, and outputs the calculated ultimate likelihood to the identical object determination unit 305.

In a step S806, the tracking unit 303 obtains the plurality of frame images outputted from the image obtaining unit 301, and performs a tracking process for tracking a target object with respect to the obtained frame images. Note here that a target object to be tracked is decided on the basis of the position information and size information on the target object obtained from the identical object determination unit 305. Position information and size information and a likelihood of the target object obtained as the result of the tracking process are outputted to the tracking likelihood conversion unit 304 and the identical object determination unit 305.

In a step S807, the tracking likelihood conversion unit 304 obtains the tracking results outputted from the tracking unit 303 and converts, with reference to the obtained position information and size information and the likelihood of the target object, the likelihood into a form usable in the detection unit 302.

In a step S808, the tracking likelihood conversion unit 304 outputs the likelihood converted in the step S807 to the detection unit 302. In a step S809, the tracking unit 303 calculates an ultimate likelihood by combining the likelihood obtained from the detection likelihood conversion unit 306 with the likelihood of the target object in an image obtained by the tracking process, and outputs the calculated ultimate likelihood to the identical object determination unit 305.

A process in a step S810 is equivalent to that in a step S111 and therefore a description thereof is omitted. All the steps in the flowchart of FIG. 7 thus end. As has been described above, according to the present embodiment, a complementary process is carried out such that the process results of both the detection process and the tracking process are reflected on each other. This allows the present embodiment to provide robust detection and tracking of a target object against change in pose or occlusion of the target object.

(Embodiment 4)

Figure 9:
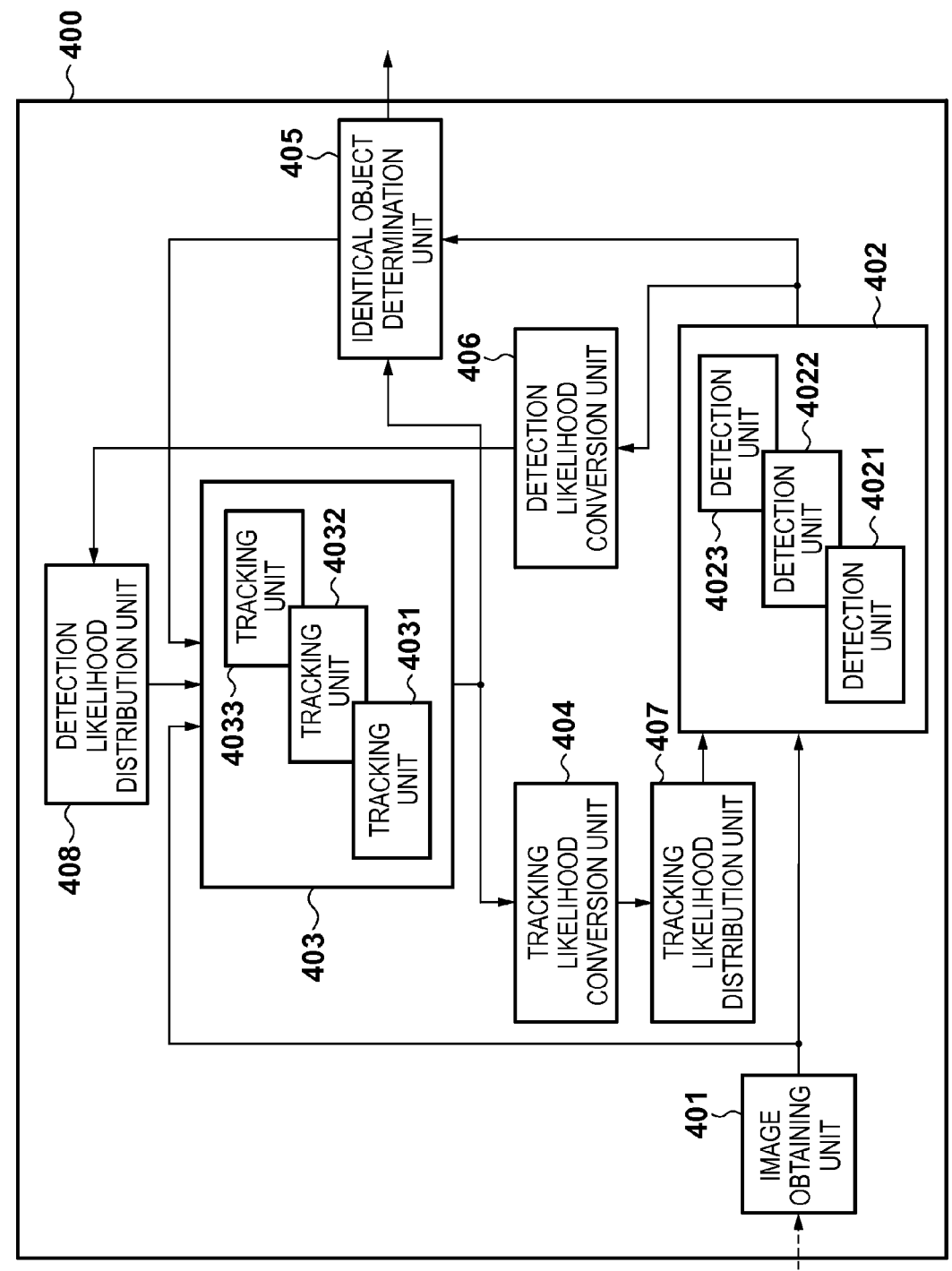
FIG. 9 illustrates a configuration of an object detection apparatus according to Embodiment 4.

A configuration of an object detection apparatus 400 according to Embodiment 4 will be described with reference to FIG. 9. The object detection apparatus 400 includes: an image obtaining unit 401; a detection unit 402; a tracking unit 403; a tracking likelihood conversion unit 404; an identical object determination unit 405; a detection likelihood conversion unit 406; a tracking likelihood distribution unit 407; and a detection likelihood distribution unit 408. The detection unit 402 includes a plurality of detection units, such as a detection unit 4021, a detection unit 4022, and a detection unit 4023. Similarly, the tracking unit 403 includes a plurality of tracking units, such as a tracking unit 4031, a tracking unit 4032, and a tracking unit 4033. A detection unit and a tracking unit can be provided respectively for each part to be detected and to be tracked of a target object.

The object detection apparatus 400 of Embodiment 4 differs from the object detection apparatus 300 of Embodiment 3, in that the object detection apparatus 400 includes, in addition to the configuration of object detection apparatus 300, the tracking likelihood distribution unit 407 and the detection likelihood distribution unit 408, and that the detection unit 402 and the tracking unit 403 include one or more detection units and one or more tracking units, respectively. While the present embodiment discusses a configuration in which three detection units and three tracking units are provided, it should be noted that the number of each unit is not necessarily three. The detection unit 4021 can detects an entire region of a target object. The detection unit 4022 can detect a face region if the target object is a human. And, the detection unit 4023 can detect another region of the human, such as hands or feet. Similarly, the tracking units 4031, 4032, and 4033 can respectively track the corresponding regions that the detection units have detected.

The image obtaining unit 401, the detection unit 402, the tracking unit 403, the tracking likelihood conversion unit 404, and the identical object determination unit 405 perform the same process as those of the respectively corresponding units of Embodiment 3, and therefore descriptions thereof are omitted.

The tracking likelihood distribution unit 407 distributes likelihoods which are outputted respectively from the tracking units 4031, 4032, and 4033 that constitute the tracking unit 403, and converted by the tracking likelihood conversion unit 404, to the detection units 4021, 4022, and 4023 that constitute the detection unit 402 and respectively correspond to the tracking units. The distribution is carried out on the basis of information on a model detected by the detection unit 402, and information on a target model tracked by the tracking unit 403. For example, in a case where the tracking unit 4031 tracked an entire region of a human, the tracking likelihood distribution unit 407 distributes the likelihood to the detection unit 4021 associated with an entire body of a human model. In a case where the tracking unit 4032 tracked a face region of the human, the tracking likelihood distribution unit 407 distributes the likelihood to the detection unit 4022 associated with a face region of the human model. In a case where the tracking unit 4033 tracked another region of the human, such as hands or feet, the tracking likelihood distribution unit 407 distributes the likelihood to the corresponding detection unit 4023 associated with another region of the human model.

The detection likelihood distribution unit 408 distribute likelihoods which are outputted from the detection units 4021, 4022, and 4023 that constitute the detection unit 402, and converted by the detection likelihood conversion unit 406, to the tracking units 4031, 4032, and 4033 that constitute the tracking unit 403 and respectively correspond to the detection units. The distribution is carried out on the basis of information on a target model detected by the detection unit 402, and information on a target model tracked by the tracking unit 403. For example, in a case where the detection unit 4021 detected an entire region of a human, the detection likelihood distribution unit 408 distributes the likelihood to the corresponding tracking unit 4031. In a case where the detection unit 4022 detected a face region of the human, the detection likelihood distribution unit 408 distributes the likelihood to the corresponding tracking unit 4032. In a case where the detection unit 4023 detected another region of the human, such as hands or feet, the detection likelihood distribution unit 408 distributes the likelihood to the corresponding tracking unit 4033.

Referring now to a flowchart of FIG. 10, processing steps to be performed by the object detection apparatus 400 of Embodiment 4 will be described. Processes in steps S1001 through S1003 are equivalent to those in the steps S801 through S803, and therefore descriptions thereof are omitted. In a step S1004, the detection likelihood conversion unit 406 outputs the likelihoods converted in a step S1003 to the detection likelihood distribution unit 408.

In a step S1005, the detection likelihood distribution unit 408 distributes the likelihoods which are outputted from the detection units 4021, 4022, and 4023 that constitute the detection unit 402, and converted by the detection likelihood conversion unit 406, to the tracking units 4031, 4032, and 4033 that constitute the tracking unit 403 and respectively correspond to the detection units. The distribution is carried out on the basis of information on a target model detected by the detection unit 402, and information on a target model tracked by the tracking unit 403.

In a step S1006, the detection unit 402 calculates ultimate likelihood by combining likelihoods obtained from the tracking likelihood distribution unit 407, with the likelihoods of the target object in images obtained by the detection process, and then outputs the calculated ultimate likelihood to the identical object determination unit 405.

Processes in steps S1007 through S1008 are equivalent to those in the steps S806 through S807, and therefore descriptions thereof are omitted. In a step S1009, the tracking likelihood conversion unit 404 outputs the likelihoods converted in the step S1008 to the tracking likelihood distribution unit 407.

In a step S1010, the tracking likelihood distribution unit 407 distributes the likelihoods which are outputted from the tracking units 4031, 4032, and 4033 that constitute the tracking unit 403, and converted by the tracking likelihood conversion unit 404, to the detection units 4021, 4022, and 4023 that constitute the detection unit 402 and respectively correspond to the detection units. The distribution is carried out on the basis of information on a model detected by the detection unit 402, and information on a target model tracked by the tracking unit 403.

In a step S1011, the tracking unit 403 calculates ultimate likelihood by combining the likelihoods obtained from the detection likelihood distribution unit 408, with the likelihoods of the target object in images obtained by the tracking process, and then outputs the calculated ultimate likelihood to the identical object determination unit 405. A process in a step S1012 is equivalent to that in the step S809, and therefore a description thereof is omitted. All the steps in the flowchart of FIG. 10 thus end.

As has been described above, according to the present embodiment, a complementary process is carried out such that both the results of the detection process and the tracking process are reflected on each other for each region of a target object. Therefore, the present embodiment allows robust detection and tracking of a target object against change in pose or occlusion of the target object.

According to the present invention, robust detection of a target object can be attained against change in pose or occlusion of the target object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262655, filed on Nov. 30, 2011, which is hereby incorporated by reference herein in its entirety.

What is claimed is:

1. An object detection apparatus comprising:
at least one processor and memory coupled to each other and cooperating to act as:
an image obtaining unit configured to sequentially obtain a plurality of frame images;
a detection unit configured to calculate a detection likelihood from an image pyramid generated by enlarging or reducing each of the plurality of frame images, and to detect a target object from each of the frame images on the basis of the detection likelihood;
a tracking unit configured to calculate a tracking likelihood of the target object from each of the plurality of frame images, and to track the target object over the plurality of frame images on the basis of the tracking likelihood, and,
a tracking likelihood conversion unit configured to convert the tracking likelihood of the target object so as to be subject to a likelihood calculation processing in a detection processing, on the basis of position information and size information on the target object,
wherein the detection unit detects the target object from the frame images obtained by the image obtaining unit on the basis of the converted tracking likelihood of the target object, and the detection likelihood of the target object that is calculated by the detection unit from the frame images.

2. The object detection apparatus according to claim 1, further comprising:
a detection likelihood conversion unit configured to convert the detection likelihood of the target object so as to be subjected to the likelihood calculation processing in a tracking processing, on the basis of position information and size information on the target object,
wherein
the tracking unit tracks the target object on the basis of the tracking likelihood of the target object that is calculated by the tracking unit from the frame images obtained by the image obtaining unit and the converted detection likelihood of the target object.

3. The object detection apparatus according to claim 1, wherein
the detection unit includes a plurality of detection units configured to detect respective parts of the target object, the number of the detection units depending on the number of the parts to be detected of the target object,
the tracking unit includes a plurality of tracking units configured to track the respective parts of the target object, the plurality of tracking units respectively corresponding to the plurality of detection units, the number of the tracking units depending on the number of the parts to be tracked of the target object,
the tracking likelihood conversion unit is configured to convert a plurality of tracking likelihoods of the target object so as to be subjected to the likelihood calculation processing in the detection processing, on the basis of position information and size information on the target object,
and
the detection unit detects the target object from the frame images obtained by the image obtaining unit on the basis of the plurality of tracking likelihoods of the target object that are converted by the tracking likelihood conversion unit and a plurality of detection likelihoods of the target object that are calculated by the plurality of detection units from the frame images.

4. The object detection apparatus according to claim 3, wherein the detection likelihood conversion unit is configured to convert a plurality of detection likelihoods of the target object so as to be subjected to the likelihood calculation processing in a tracking processing, on the basis of position information and size information on the target object, and the tracking unit tracks the target object on the basis of the plurality of tracking likelihoods of the target object that are calculated by the plurality of tracking units from the frame images obtained by the image obtaining unit, and the plurality of detection likelihoods of the target object that are converted by the detection likelihood conversion unit.

5. An object detection apparatus comprising:

at least one processor and memory coupled to each other and cooperating to act as:

an image obtaining unit configured to sequentially obtain a plurality of frame images;

a detection unit configured to calculate a detection likelihood from an image pyramid generated by enlarging or reducing each of the plurality of frame images, and to detect a target object from each of the frame images on the basis of the detection likelihood;

a tracking unit configured to calculate a tracking likelihood of the target object from each of the plurality of frame images, and to track the target object over the plurality of frame images on the basis of the tracking likelihood, and a detection likelihood conversion unit configured to convert the detection likelihood of the target object so as to be subjected to a likelihood calculation processing in a tracking processing, on the basis of position information and size information on the target object, wherein the tracking unit tracks the target object on the basis of the tracking likelihood of the target object that is calculated by the tracking unit from the frame images obtained by the image obtaining unit, and the converted detection likelihood of the target object.

6. A method for controlling an object detection apparatus, comprising the steps of:

sequentially obtaining a plurality of frame images;

calculating a detection likelihood from an image pyramid generated by enlarging or reducing each of the plurality of frame images, and detecting a target object from each of the frame images on the basis of the detection likelihood;

calculating a tracking likelihood of the target object from each of the plurality of frame images, and tracking the target object over the plurality of frame images on the basis of the tracking likelihood;

converting the tracking likelihood of the target object so as to be subjected to a likelihood calculation processing in a detection processing, on the basis of position information and size information on the target object; and wherein in the detecting step, the target object is detected from the frame images obtained in the image obtainment step on the basis of the converted tracking likelihood of the target object, and the detection likelihood of the target object that is calculated in the detection step from the frame images.

7. A method for controlling an object detection apparatus, comprising the steps of:

sequentially obtaining a plurality of frame images;

calculating a detection likelihood from an image pyramid generated by enlarging or reducing each of the plurality of frame images, and detecting a target object from each of the frame images on the basis of the detection likelihood;

calculating a tracking likelihood of the target object from each of the plurality of frame images, and tracking the target object over the plurality of frame images on the basis of the tracking likelihood;

converting the detection likelihood of the target object so as to be subjected to a likelihood calculation processing in a tracking processing, on the basis of position information and size information on the target object; and wherein in the tracking step, the target object is tracked on the basis of the tracking likelihood of the target object that is calculated in the tracking step from the frame images obtained in the image obtainment step, and the converted detection likelihood of the target object.

8. A non-transitory computer-readable storage medium storing a computer program for causing a computer to execute the steps of a method for controlling an object detection apparatus, comprising the steps of:

sequentially obtaining a plurality of frame images;

calculating a detection likelihood from an image pyramid generated by enlarging or reducing each of the plurality of frame images, and detecting a target object from each of the frame images on the basis of the detection likelihood;

calculating a tracking likelihood of the target object from each of the plurality of frame images, and tracking the target object over the plurality of frame images on the basis of the tracking likelihood;

converting the tracking likelihood of the target object so as to be subjected to a likelihood calculation processing in a detection processing, on the basis of position information and size information on the target object; and wherein in the detecting step, the target object is detected from the frame images obtained in the image obtainment step on the basis of the converted tracking likelihood of the target object, and the detection likelihood of the target object that is calculated in the detection step from the frame images.

9. A non-transitory computer-readable storage medium storing a computer program for causing a computer to execute the steps of a method for controlling an object detection apparatus, comprising the steps of:

sequentially obtaining a plurality of frame images;

calculating a detection likelihood from an image pyramid generated by enlarging or reducing each of the plurality of frame images, and detecting a target object from each of the frame images on the basis of the detection likelihood;

calculating a tracking likelihood of the target object from each of the plurality of frame images, and tracking the target object over the plurality of frame images on the basis of the tracking likelihood;

converting the detection likelihood of the target object so as to be subjected to a likelihood calculation processing in a tracking processing, on the basis of position information and size information on the target object, wherein in the tracking step, the target object is tracked on the basis of the tracking likelihood of the target object that is calculated in the tracking step from the frame images obtained in the image obtainment step, and the converted detection likelihood of the target object.

* * * * *